May 29, 1956     T. W. CLAVELL     2,747,901
AUXILIARY SEAL AND SUPPORT FOR A SHAFT WITHIN A HOUSING
Filed April 25, 1955     3 Sheets-Sheet 1

INVENTOR.
Thomas W. Clavell
BY Campbell, Brumbaugh, Free & Graves
ATTORNEY

May 29, 1956 T. W. CLAVELL 2,747,901
AUXILIARY SEAL AND SUPPORT FOR A SHAFT WITHIN A HOUSING
Filed April 25, 1955 3 Sheets-Sheet 2

INVENTOR.
Thomas W. Clavell
BY Campbell, Brumbaugh,
Free & Graves
ATTORNEY

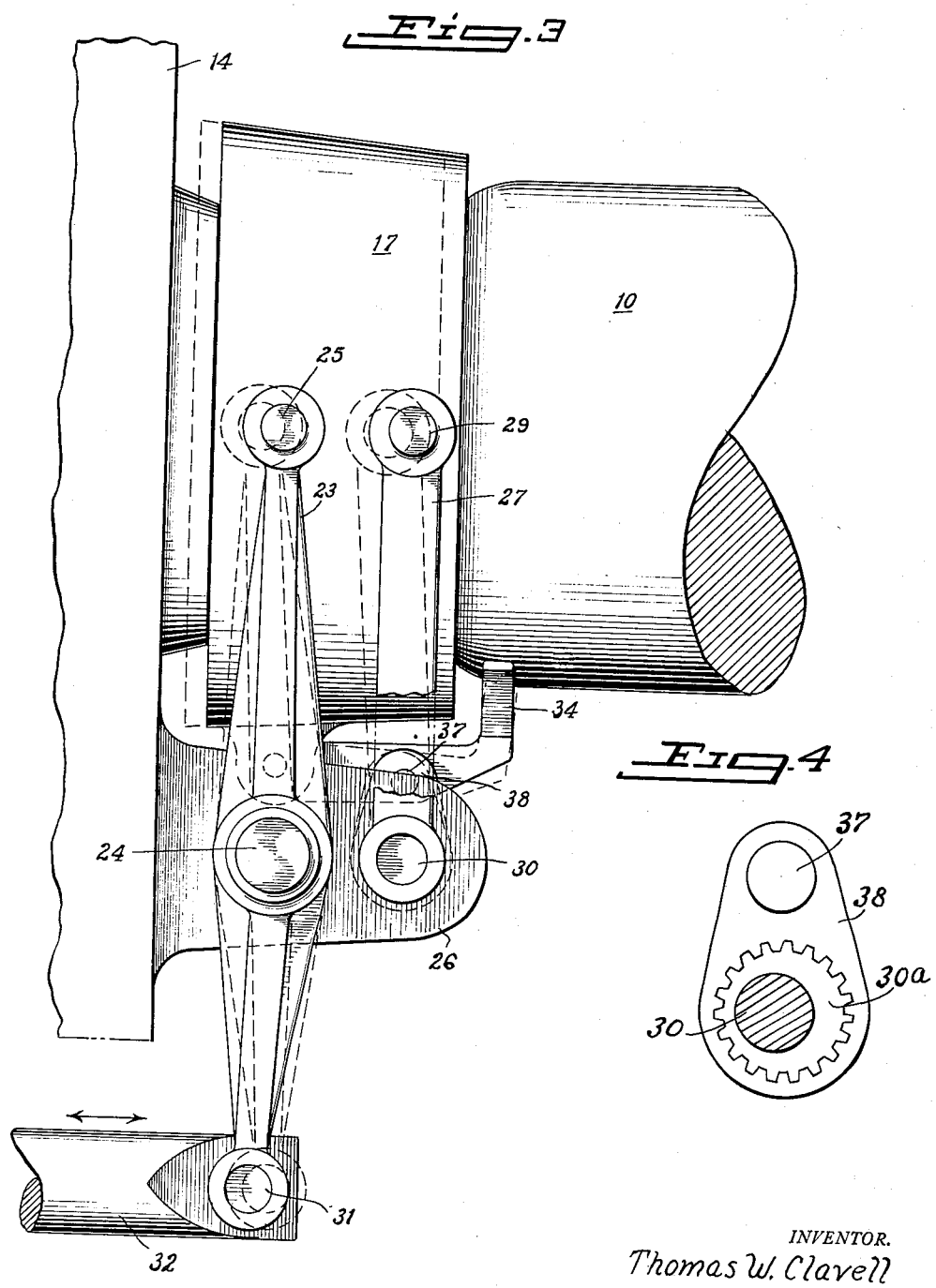

United States Patent Office 2,747,901
Patented May 29, 1956

2,747,901
AUXILIARY SEAL AND SUPPORT FOR A SHAFT WITHIN A HOUSING

Thomas W. Clavell, Hempstead, N. Y., assignor to Fairchild Engine and Airplane Corporation, Farmingdale, N. Y., a corporation of Maryland Application April 25, 1955, Serial No. 503,594

4 Claims. (Cl. 286—11)

This invention relates to auxiliary sealing apparatus for a shaft which operates within a sealed housing and, more particularly, to an auxiliary sealing apparatus of that general organization wherein a sealing element of the apparatus is normally in a retracted, inoperative position during the regular operation of the shaft, but wherein the sealing element may be readily adjusted to an operative sealing position with the shaft.

In certain machines, such as pumps or compressors, the replacement of a primary sealing device for a shaft which operates within the housing or which extends through the housing, such as for connection to a prime mover, is a time-consuming procedure requiring the machine to be disconnected entirely from the fluid circuit and the fluid to be evacuated from the housing before the old primary sealing device can be removed. The auxiliary sealing apparatus of the present invention, however, permits the removal or replacement of a primary sealing device without requiring the machine to be disconnected from the fluid circuit, or the fluid to be evacuated from the housing.

In a preferred embodiment of the present invention, the auxiliary sealing apparatus includes a sealing element supported for movement relative to the shaft from a normally retracted, inoperative position to an operative position in sealing contact with the periphery of the shaft. When the apparatus is in operation, the sealing element will not interfere with the rotation of the shaft, and the housing is maintained sealed by a primary sealing device. When, however, it is desired to remove the primary sealing device, the sealing element may be moved into sealing contact with the periphery of the shaft, thereby preventing any escape of fluid from the housing. As soon as the primary sealing device has been replaced, the sealing element may be again moved to an inoperative position. Thus, it is evident that by means of the present invention the primary sealing device may be replaced for a rotating shaft which operates within a sealed housing while the fluid remains within the housing and without necessitating the isolation of the apparatus from the fluid circuit.

The operation of the sealing element from a retracted, inoperative position into sealing contact with the shaft is accomplished by actuating means conveniently accessible to the operator. As a further feature of the present invention, the actuating means in addition to controlling the operation of the sealing element, also moves a supporting member for the shaft into contact with the shaft, the supporting member bearing the weight of the shaft while the primary sealing element and/or bearing is removed. The supporting member, like the sealing element, is normally in an inoperative, retracted position, however, simultaneously with the movement of the sealing element into contact with the shaft, the supporting member for the shaft is moved into operative position, and simultaneously with the movement of the seal to retracted position, the supporting member is moved to retracted position.

For a more complete understanding of the present invention, reference may be had to the description which follows and to the accompanying drawings wherein:

Fig. 3 is a side view taken on the lines 3—3 of Fig. 2, looking in the direction of the arrows; and Fig. 4 is an enlarged view of a modified version of certain parts shown in Fig. 1.

Figure 1:
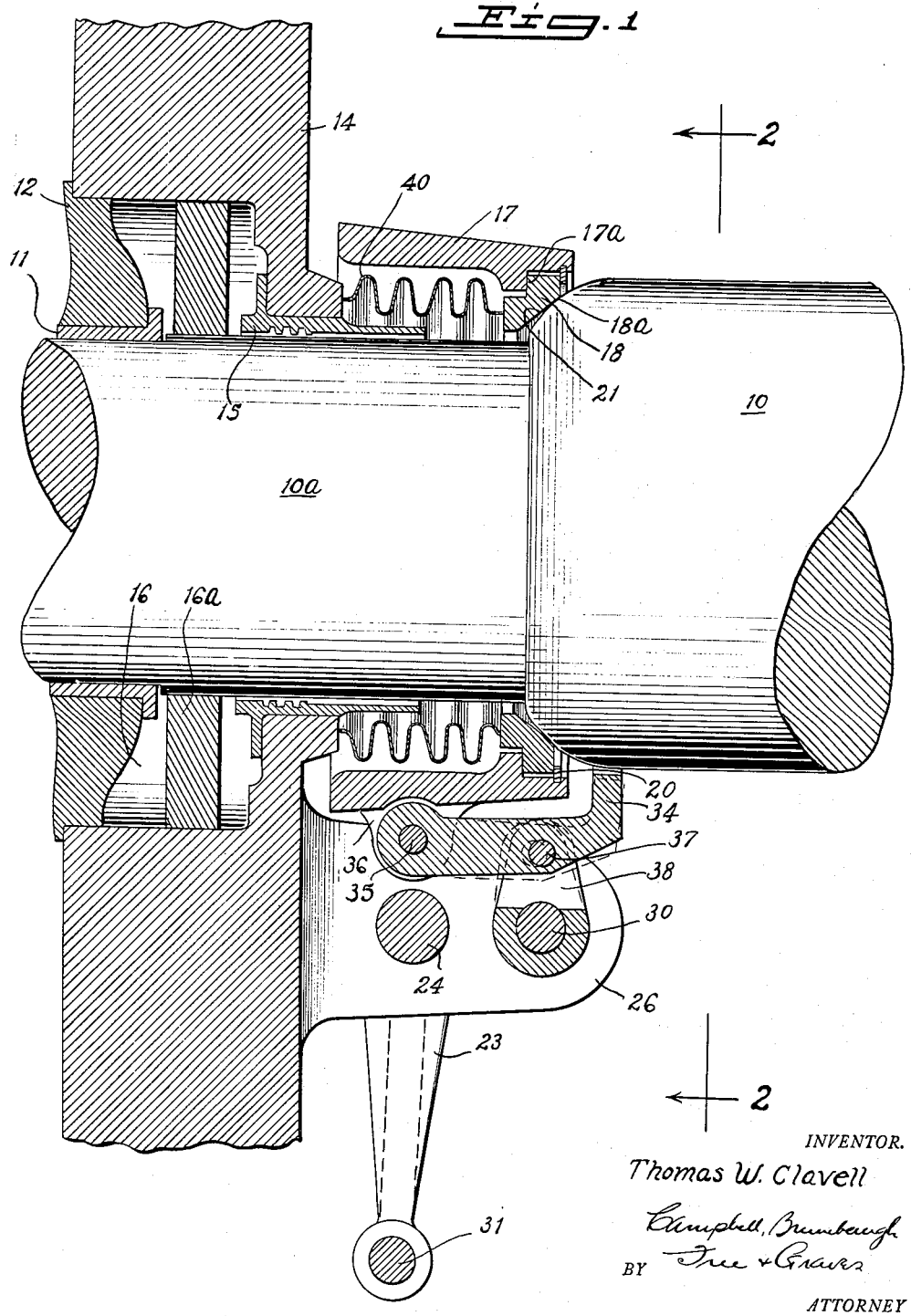
Fig. 1 is a side elevation, partly in cross section, of a shaft in a housing and including the sealing apparatus of the present invention.

Referring to the drawings, the shaft 10 having an end 10a of reduced diameter is rotatably supported in a bearing 11. The bearing 11, in turn, is fitted into a support 12 mounted in the housing 14. Inside the housing 14 a tubular seal 15 forms a restricted opening in the housing to accommodate the shaft end 10a, and a chamber 16 is defined between the member 15 and the bearing. This chamber accommodates the primary sealing device 16A.

Within the housing a circular collar 17 encircles the end 10a of the shaft, and the collar accommodates a seal 18 therein. The collar 17 is shiftable axially upon the shaft end 10a from a normally inoperative, retracted position, in which position the seal is out of engagement with the shaft, to an operative position, shown in Fig. 1, in which the seal engages the entire periphery of the shaft. The seal 18 is supported loosely within the collar between a shoulder 17a formed on the inner periphery of the collar and a lock ring 20 which retains the seal within the collar. The seal is provided with a tapered surface 18a, which moves into contact with a mating surface 21 of the shaft 10, and the looseness of the seal within the collar allows it to center itself against the surface 21 of the shaft.

The shiftable unit comprising the collar 17 and the seal 18 accommodated therein is supported between a pair of levers 23 (see Fig. 3) both pivotally mounted on a shaft 24, and the shaft 24 is supported between a pair of bosses 26 formed integrally with the inner wall of the housing. The upper ends of the levers 23 are pivotally connected to stub shafts 25 extending outwardly from opposite sides of the outer surface of the collar. In order to permit the collar 17 to move concentrically with respect to the shaft end 10a, the collar is given additional support between a pair of pivotal arms 27. The upper ends of the arms 27 are pivotally connected to stub shafts 29 extending outwardly from opposite sides of the collar 17, and the lower ends of the arms 27 are mounted on a common pivotal shaft 30 also supported between the bosses 26.

The extreme lower ends of the levers 23 are connected by means of a shaft 31 to a movable actuator 32 (see Fig. 3), and the actuator extends through an opening in the housing 14 so that it will be accessible to the operator from the outside of the housing.

Figure 2:
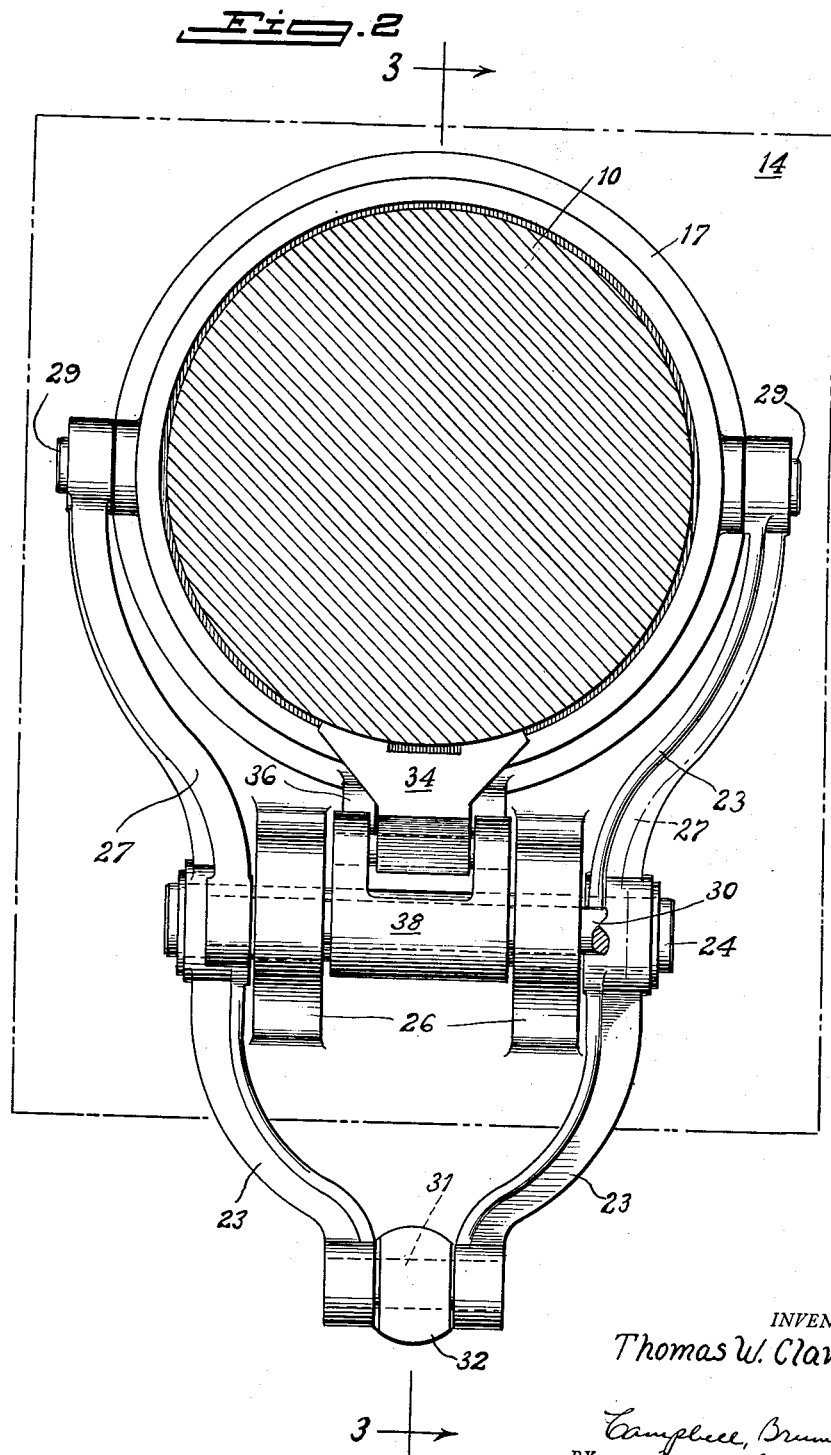
Fig. 2 is an end view of the apparatus shown in Fig. 1 taken on the line 2—2 of Fig. 1, looking in the direction of the arrows.

The actuator 32, in addition to shifting the collar 17 from a retracted to an operative position, moves a seat member 34 upwardly into contact with the shaft 10 to support the shaft when bearing and primary sealing device are removed. As best shown in Fig. 1, the seat 34 is pivotally connected to the collar 17 by means of the shaft 35 which is supported between a pair of bosses 36 (see Fig. 2) formed integrally from the lower end of the collar 17. The seat 34 is also pivotally connected by means of the shaft 37 to a crank arm 38, and the crank arm 38 is mounted on the shaft 30. The normal inoperative position of the seal 34 is indicated by the broken lines in Fig. 3, however, when the actuator 32 is moved in a leftwardly direction as indicated in that figure to move the collar 17 into operative sealing engagement with the shaft 10, the seat 34 will be pivoted by the rotation of the crank arm 38 into engagement with the shaft 10. If the crank arm 38 is rotated just slightly over center, that is, past the vertical position, the weight of the shaft, when the bearing is removed, will help to lock the actuator in the actuated position.

To insure that the seat 34 will be raised to a position to provide a proper support for the shaft 10, the crank arm 38 may be mounted on the shaft 30 through a gear 30a eccentrically mounted on the shaft 30. The teeth of the gear 30a engage teeth formed on the inner periphery of the hole which accommodates the gear 30a, and the meshing teeth form a splined connection between the crank arm 38 and the shaft 30. The relative position of the eccentric gear 30a and the crank arm may be set initially, so that the operation of the actuator 32 will always raise the seat 34 to a height determined by this initial adjustment.

As best shown in Fig. 1, a flexible bellows 40 is brazed at one end to the housing 14 and at the other end to the seal 18. The bellows 40 surrounds the shaft end 10a and is expandable when the collar 17 is moved into operative engagement with the shaft and collapsible when the collar 17 is retracted to its inoperative position.

As explained above, the collar 17 and the seal 18 carried therein is normally in the retracted, inoperative position as indicated by the broken lines in Fig. 3. When thus retracted, the shaft 10, being rotatably supported by the bearing 11, is free to operate in the regular way. In its retracted position, therefore, the auxiliary sealing unit of the present invention does not perform any sealing function. When, however, the collar is shifted by the operation of the actuator 32 into operative position, the seal 18 will move toward the spherical surface 21 of the shaft 10, and the conical surface 18a of the sealing element will conform to the surface 21 of the shaft to form an effective fluid-tight seal. In addition, the bellows seal 40 will expand to form an effective seal between the sealing element 18 and the housing 14.

Also, in order that the sealing element 18 will not have to support the entire weight of the shaft 10 after the bearing 11 is removed, the apparatus of the present invention is provided with the movable support 34 which moves into contact with the lower periphery of the shaft 10 when the collar 17 is actuated to operative position to support the weight of the shaft.

The invention has been shown in a single preferred form and by way of example only, and obviously many variations and modifications may be made therein without departing from the spirit of the invention. The invention, therefore, is not to be limited to any specified form or embodiment, except in so far as such limitations are set forth in the claims.

I claim:

1. An auxiliary seal for a shaft which operates within a sealed housing comprising a sealing element supported for movement relative to the shaft from a retracted inoperative position to an operative position in sealing contact with the periphery of the shaft, an expandable sealing means connected between the housing and the sealing element, forming a continuous seal therebetween, actuating means to shift the sealing element from the inoperative, retracted position into sealing contact with the shaft, a support for said shaft, said shaft support being normally in an inoperative position, and means controlled by said actuating means to move the support into supporting contact with said shaft.

2. An auxiliary seal for a shaft which is supported in a sealed housing by a bearing comprising a sealing element encircling the shaft, a support for the sealing element movable coaxially with respect to the shaft from a normally inoperative, retracted position to an operative position in which the sealing element has sealing contact with the shaft, actuating means to shift the sealing element support from the retracted to the operative position, and a support for the shaft movable into engagement with the shaft by the operation of the actuating means.

3. An auxiliary seal for a shaft which operates within a closed housing and is supported by a bearing comprising a sealing element within the housing and encircling the shaft, a support for the sealing element movable coaxially with respect to the shaft from a normally inoperative, retracted position to an operative position in which the sealing element has sealing contact with the shaft, an expandable bellows connecting the sealing element and the housing, said bellows completely surrounding the shaft, actuating means to shift the sealing element support from the retracted to the operative position, and a movable support for the shaft controlled by the operation of the actuating means, whereby the shaft support may be moved into supporting contact with the shaft to provide the support for the shaft when the bearing is removed.

4. An auxiliary seal for a shaft which is supported in a sealed housing by a bearing comprising a sealing element encircling the shaft, a support for the sealing element movable coaxially with respect to the shaft from a normally inoperative, retracted position to an operative position in which the sealing element has sealing contact with the shaft, actuating means to shift the sealing element support from the retracted to the operative position, a support for the shaft movable into engagement with the shaft by the operation of the actuating means, and an eccentric connection between the shaft support and the actuating means for adjusting the position to which the shaft support is shifted.

References Cited in the file of this patent

UNITED STATES PATENTS

| | | |
|---|---|---|
| 2,163,153 | Peterson | June 20, 1939 |
| 2,631,050 | Haeberlein | Mar. 10, 1953 |

FOREIGN PATENTS

| | | |
|---|---|---|
| 947,412 | France | Jan. 10, 1949 |